(12) United States Patent
Yamazaki et al.

(10) Patent No.: US 7,864,151 B1
(45) Date of Patent: Jan. 4, 2011

(54) PORTABLE ELECTRONIC DEVICE

(75) Inventors: Shunpei Yamazaki, Tokyo (JP); Toshiji Hamatani, Atsugi (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 0 days.

(21) Appl. No.: 07/825,784

(22) Filed: Jan. 21, 1992

Related U.S. Application Data

(63) Continuation of application No. 07/417,067, filed on Oct. 4, 1989, now abandoned, which is a continuation-in-part of application No. 07/205,750, filed on Jun. 13, 1988, now abandoned, which is a continuation-in-part of application No. 07/070,589, filed on Jul. 7, 1987, now abandoned.

(30) Foreign Application Priority Data

| | | |
|---|---|---|
| Jul. 7, 1986 | (JP) | ................................. 61-160651 |
| Sep. 1, 1986 | (JP) | ................................. 61-134751 |
| Oct. 6, 1988 | (JP) | ................................. 63-252470 |

(51) Int. Cl.
  *G09G 3/36* (2006.01)
(52) U.S. Cl. ......................................... 345/97; 345/901
(58) Field of Classification Search ................. 345/401, 345/905, 97, 169, 173, 87, 115, 185, 211, 345/9, 901, 179, 204, 690
  See application file for complete search history.

(56) References Cited

U.S. PATENT DOCUMENTS

| | | | |
|---|---|---|---|
| 3,668,106 A | 6/1972 | Ota | |
| 4,017,725 A | 4/1977 | Roen | ........................... 235/152 |
| 4,032,971 A | 6/1977 | Camerik | |
| 4,041,481 A | 8/1977 | Sato | |
| 4,106,047 A | 8/1978 | Lindmayer | |
| 4,150,435 A | 4/1979 | Satoh | |
| 4,159,417 A | 6/1979 | Rubincam | ................... 235/375 |
| 4,264,962 A | 4/1981 | Kodaira | ..................... 364/707 |
| 4,277,145 A | 7/1981 | Hareng et al. | |
| 4,293,808 A | 10/1981 | Varadi et al. | ................... 320/2 |

(Continued)

FOREIGN PATENT DOCUMENTS

| | | |
|---|---|---|
| EP | 0 121 251 A2 | 10/1984 |
| EP | 0 126 542 A2 | 11/1984 |
| EP | 0 145 206 | 6/1985 |
| EP | 0 167 398 | 1/1986 |
| EP | 0 198 093 A1 | 10/1986 |

(Continued)

OTHER PUBLICATIONS

Kazan, "Liquid Crystal Display with Power Amplification", Xerox Disclosure Journal, vol. 5, No. 4, Jul./Aug. 1980, p. 409-410.

(Continued)

*Primary Examiner*—Ricardo L Osorio
(74) *Attorney, Agent, or Firm*—Nixon Peabody LLP; Jeffrey L. Costellia

(57) ABSTRACT

A thin, readily portable book has a memory-type liquid crystal display in the display section of the thin portable book so as to obtain low power consumption along with compact size and reduced weight, a solar cell and a charging device in the energy section of the thin portable book, so that low power consumption is further promoted, a freely detachable cassette-type or card-type non-volatile semiconductor memory in the recording medium section of the thin portable book so as to provide further savings in power consumption.

151 Claims, 5 Drawing Sheets

U.S. PATENT DOCUMENTS

| | | | | |
|---|---|---|---|---|
| 4,345,248 A | 8/1982 | Togashi et al. | | 340/784 |
| 4,409,605 A | 10/1983 | Ovshinsky et al. | | 357/2 |
| 4,413,314 A | 11/1983 | Slater et al. | | 364/188 |
| 4,534,012 A | 8/1985 | Yokozawa | | |
| 4,538,884 A | 9/1985 | Masaki | | |
| 4,563,059 A | 1/1986 | Clark et al. | | 350/330 |
| 4,571,456 A | 2/1986 | Paulsen et al. | | |
| 4,587,520 A | 5/1986 | Astle | | 340/712 |
| 4,639,720 A | 1/1987 | Rympalski et al. | | 340/712 |
| 4,651,146 A | 3/1987 | Lucash et al. | | 340/721 |
| 4,653,020 A | 3/1987 | Cheselka et al. | | 364/900 |
| 4,654,467 A | 3/1987 | Yamazaki | | 136/251 |
| 4,668,051 A | 5/1987 | Mourey et al. | | |
| 4,686,321 A | 8/1987 | Kishi | | |
| 4,693,561 A | 9/1987 | Ashley | | |
| 4,697,887 A | 10/1987 | Okada et al. | | |
| 4,709,995 A | 12/1987 | Kuribayashi et al. | | |
| 4,775,549 A | 10/1988 | Ota et al. | | |
| 4,785,564 A | 11/1988 | Gurtler | | 40/448 |
| 4,818,077 A | 4/1989 | Ohwada et al. | | |
| 4,820,167 A * | 4/1989 | Nobles et al. | | 434/336 |
| 4,826,293 A | 5/1989 | Grinberg et al. | | |
| 4,855,725 A | 8/1989 | Fernandez | | 340/706 |
| 4,887,234 A * | 12/1989 | Iijima | | 364/900 |
| 4,890,257 A | 12/1989 | Anthias et al. | | 364/900 |
| 4,924,411 A | 5/1990 | Kashiwagi | | 364/518 |
| 4,972,496 A * | 11/1990 | Sklarew | | 382/187 |
| 4,981,340 A | 1/1991 | Kurematsu et al. | | |
| 4,985,697 A * | 1/1991 | Boulton | | 715/203 |
| 5,026,144 A | 6/1991 | Taniguchi et al. | | |
| 5,092,665 A | 3/1992 | Kanbe et al. | | |
| 5,339,091 A | 8/1994 | Yamazaki et al. | | 345/184 |
| 5,475,398 A | 12/1995 | Yamazaki et al. | | 345/104 |
| 5,475,399 A * | 12/1995 | Borsuk | | 345/472 |
| 5,893,132 A | 4/1999 | Huffman et al. | | |
| 5,952,990 A | 9/1999 | Inoue et al. | | |
| 5,990,859 A | 11/1999 | Inoue et al. | | |
| 6,262,705 B1 | 7/2001 | Inoue et al. | | |

FOREIGN PATENT DOCUMENTS

| | | |
|---|---|---|
| EP | 0 252 646 A1 | 1/1988 |
| GB | 1 456 293 | 11/1976 |
| GB | 2 049 253 | 12/1980 |
| GB | 2 149 544 | 6/1985 |
| JP | 63-62033 | 3/1888 |
| JP | 57189052 | 5/1956 |
| JP | 51-129036 | 10/1976 |
| JP | 52-63044 | 5/1977 |
| JP | 52-123274 | 10/1977 |
| JP | 56-58281 | 5/1981 |
| JP | 56-101665 | 8/1981 |
| JP | 56-132650 | 10/1981 |
| JP | 56-137254 | 10/1981 |
| JP | 56-169287 | 12/1981 |
| JP | 57-30009 | 2/1982 |
| JP | 57-147767 | 9/1982 |
| JP | 57-151647 | 9/1982 |
| JP | 57-194586 | 11/1982 |
| JP | 58-149524 | 9/1983 |
| JP | 59-116869 | 7/1984 |
| JP | 59-127476 | 7/1984 |
| JP | 59-160170 | 9/1984 |
| JP | 59-197082 | 11/1984 |
| JP | 60-122995 | 7/1985 |
| JP | 60-124724 | 7/1985 |
| JP | 61-018929 | 1/1986 |
| JP | 61-077971 | 4/1986 |
| JP | 61-115251 | 7/1986 |
| JP | A6292025 | 4/1987 |
| JP | 62-270922 | 11/1987 |
| JP | A62286094 | 12/1987 |
| JP | 63-6525 | 1/1988 |
| JP | 63-6595 | 1/1988 |
| JP | 63015796 | 1/1988 |
| JP | A6321284 | 2/1988 |
| JP | 63-062033 | 3/1988 |
| JP | 63-063093 | 3/1988 |
| JP | 63-135917 | 6/1988 |
| JP | 63-163821 | 7/1988 |
| JP | 63-229430 | 9/1988 |
| JP | 63-231563 | 9/1988 |
| JP | 63-23698 | 10/1988 |
| JP | 63-236698 | 10/1988 |
| JP | 05-021158 | 5/1993 |
| JP | 63-118186 | 5/1998 |
| NL | 348 788 | 3/1979 |

OTHER PUBLICATIONS

Isailovic, *Videodisc and Optical Memory Systems*, Prentice-Hall, Inc., © 1985, pp. 20-21 Z& 318-319.

Ralston, et al., "Calculators, Eltronic and Programmable", *Encyclopedia of Computer Science and Engineering*, 2$^{nd}$ Edition, © 1983, p. 198.

USPTO Office Action of U.S. Appl. No. 09/666,472, mailed Nov. 29, 2005.

USPTO Office Action of U.S. Appl. No. 09/666,472, mailed Oct. 24, 2002.

USPTO Office Action of U.S. Appl. No. 09/666,472, mailed Jul. 15, 2003.

USPTO Office Action of U.S. Appl. No. 09/666,472, mailed Feb. 13, 2004.

USPTO Office Action of U.S. Appl. No. 09/666,472, mailed Nov. 2, 2004.

Pending claims 1-18 of U.S. Appl. No. 09/666,472 as of Jul. 12, 2004.

H.S. Hoffman, Jr., "Exact Position Detection with Finger Point and Feedback", IBM Technical Disclosure Bulletin, vol. 23, No. 6, Nov. 1980.

Beacham et al., "Using Wordperfect® 3$^{rd}$ Edition", Que Corporation, Carmel, In 1987, pp. 103-106, 119-123, 126, 136 and 137.

Murray, John M. et al., "The Architecture of an Electronic Book", IEEE Transactions on Industrial Electronics, vol. IE-29, No. 1, Feb. 1982, pp. 82-91.

Ota et al. Electrophoretic Image Display (EPID) Panel, Proceedings of the IEEE, vol. 61, No. 7, pp. 832-833, Jul. 1973.

Ota et al. Developments in Electrophoretic Displays, Proceeding of the S.I.D, vol. 18/3&4, p. p. 243-254 Third and Fourth Quarters 1977.

Office Action received in U.S. Appl. No. 09/666,472 mailed Nov. 29, 2005 (now abandoned).

Ota et al., Electrophoretic Image Display (EPID) Panel, Proceedings of the IEEE, vol. 61, No. 7, pp. 832-836, Jul. 1973.

\* cited by examiner

F I G. 3
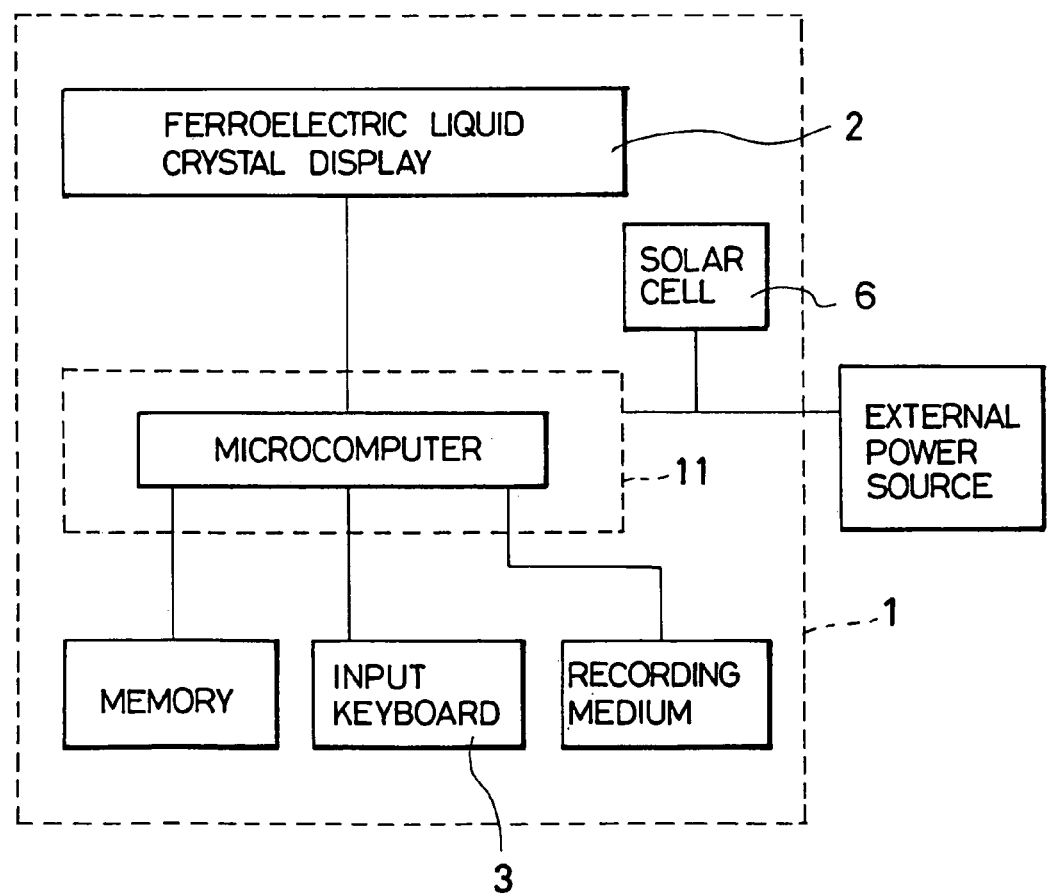

PORTABLE ELECTRONIC DEVICE

This application is a continuation of application Ser. No. 07/417,067, filed Oct. 4, 1989, which is a continuation-in-part of application Ser. No. 07/205,750, filed Jun. 13, 1988, which is a continuation-in-part of application Ser. No. 07/070,589, filed Jul. 7, 1987.

BACKGROUND OF THE INVENTION

1. Field of the Invention

The present invention relates to a thin, readily portable book, and, in particular, to a thin portable book which is mainly comprised of two parts of a recording medium freely detachable and a read-out apparatus which retrieves and displays the data stored in the recording medium.

Coded data is recorded on the recording medium as the content of the book and can be read out by a read-out means in the main body of the read-out apparatus, decoded or converted, and displayed in the form of alphanumeric characters, symbols, and images on a liquid crystal display which is part of the read-out apparatus.

2. Description of the Prior Art

Conventional books are mainly in a form whereby the alphanumeric characters, symbols, and images and so on used to display the contents of a book are printed on the surface of the paper of that book. The reader views the alphanumeric characters, symbols, and images, and the like to comprehend the contents of the book.

In many conventional books made from paper, one volume will weigh in excess of 1 kg. For example, literary novels and specialized books frequently exceed one kilogram in weight. For this reason, it frequently happens that when the books are shipped to a retail store, several tons of books are loaded onto a truck. The transportation costs and the like mount up so that the cost of one volume becomes rather high. In addition, the size of the paper on which the alphanumeric characters, symbols, and images are printed is not uniform, even with the similar content of the book, the similar type, the similar cost, and the like, so there is the problem that when a large volume is stored, a large paper area is required. In addition, primary and junior high school students whose bodies are still in a state of growth must carry many heavy texts books to and from school every day for study. This is believed to have a major adverse effect on the bodies of these students.

The applicant of the present invention has proposed a "Personal Computer System with a Built-in Solar Cell" (U.S. patent application Ser. No. 07/292,098 filed on Dec. 30, 1988) relating to all types of data processing devices to provide energy saving, in which the terminology "personal computer system" is used to indicate all types of data processing devices. This personal computer system is equipped with a built-in battery, a secondary battery, a solar cell, a liquid crystal display, a keyboard, and a cover. The liquid crystal display is provided inside the cover which opens and closes by means of rotating shaft with reference to the main body including the keyboard. The liquid crystal display is adapted to face toward the user when the cover is open. The solar cell is provided on the side of the cover where there is no liquid crystal display. Therefore, when the cover is closed, the solar cell can be seen but the liquid crystal display cannot.

This personal computer system may also be provided with a mechanism so that when the cover is closed, the secondary battery is electrically connected to the solar cell, so that the secondary battery becomes charged, while when the cover is opened, the secondary battery is electrically connected to a terminal to operate the personal computer system. In this mechanism, when the cover is closed, the secondary battery is charged by the electric power generated by the solar cell, and when the cover is opened, the electric energy with which the secondary battery had been charged can be used to operate the personal computer system. At this time, the liquid crystal display would face toward the user because the cover is opened.

The above is one example of this personal computer system which demonstrates energy saving in the operation.

This personal computer system can also be utilized as the thin portable book described previously.

In the case where the above-mentioned personal computer system in the conventional technology is applied to the thin portable book, it has some superior points and some inferior points when compared with the usual type of book prints. For example, in the personal computer system used as a thin portable book, a strong point is the fact that when only the freely detachable recording mediums are carried with the read-out apparatus left behind, this book is considerably lighter than a printed book. On the other hand, there are the drawbacks that when the personal computer system is used as the thin portable book and the read-out apparatus is also taken outdoors to read the book, the life of the charge of a dry cell and a chargeable cell is short, and when the weather is poor so that very little power can be generated by the solar cell, the personal computer system is less reliable than the normal book.

For this reason, the appearance of a new type book superior to a standard book on all points has been awaited.

SUMMARY OF THE INVENTION

An object of the present invention is to provide, with due consideration to the drawbacks of such conventional methods, a thin portable book which has improved electricity generating volume, reduced power consumption and increased electrical charge amount to realize high reliability for use outdoors over a long period with its portability and convenience maintained.

This object is achieved in the present invention by the use of a liquid crystal display with memory capabilities, in order to reduce power consumption.

When a ferroelectric liquid crystal display is used, the display drive signal may be applied to the ferroelectric liquid crystal display only when the display image is converted to another display. After the image display is changed, even if the display drive signal is not applied, the image continues to be displayed. In this type, the power consumption becomes very small in comparison with a conventional TN-type or STN-type of liquid crystal display in which a liquid crystal display drive signal must be applied 30 to 60 times per second for an image to be continued.

In addition, in the present invention, a magnetic floppy disk, an optical disk, or a non-volatile semiconductor memory is used as the freely detachable recording medium. Among these, the non-volatile semiconductor memory has the lowest power consumption. This is because the magnetic floppy disk and the optical disk is provided with a read-out machine, so that when the data stored on the magnetic floppy disk or on the optical disk is read out, electric power is necessary to activate the read-out machine, but when the data stored in the non-volatile semiconductor memory is read out, power is only used for the electrical read-out and is not required to activate such a read-out machine.

Also, the solar cells used in the present invention have been improved to upgrade the amount of electricity to be generated and to expand the replenishment of the electrical charge.

Specifically, in the configuration of the solar cells, a non-single crystal semiconductor layer of PIN, NIP, or a combination of these is formed on a transparent conductive film, e.g. of $SnO_2$, ITO, ZnO, or laminations thereof on a translucent or transparent substrate by commonly known vapor reaction technology and another transparent conductive film is formed on the above-mentioned semiconductor layer as a reverse side electrode. The "non-single crystal" mentioned above is used to mean an amorphous body and polycrystalline body other than the single crystal.

With this sort of configuration, the solar cell generates electricity both when light strikes the front and the rear of the cell. When this solar cell is mounted on the cover of the main body of the read-out apparatus, the solar cell generates electricity whether the cover is open or closed. Further, in addition to the solar cell provided on the cover, a solar cell is also provided at an optional position on the main body of the read-out apparatus, which effectively leads to the generation of a considerable amount of electricity. The electrical power generated from solar cells mounted in this manner is used to power the thin portable book of the present invention or is charged into the charging device, so that when the thin portable book of the present invention is used in a dark location, or when it is used in cloudy days, the electric power is replenished by the charging device.

In this way, the thin portable book of the present invention can be used out of doors for a prolonged period with improved reliability.

BRIEF DESCRIPTION OF THE DRAWINGS

These and other objects, features, and advantages of the present invention will become more apparent from the following description of the preferred embodiments taken in conjunction with the accompanying drawings, in which:

FIG. 3 is a block diagram of the thin portable book of FIG. 1.

DETAILED DESCRIPTION OF THE PREFERRED EMBODIMENTS

Embodiment No. 1

Figure 1:
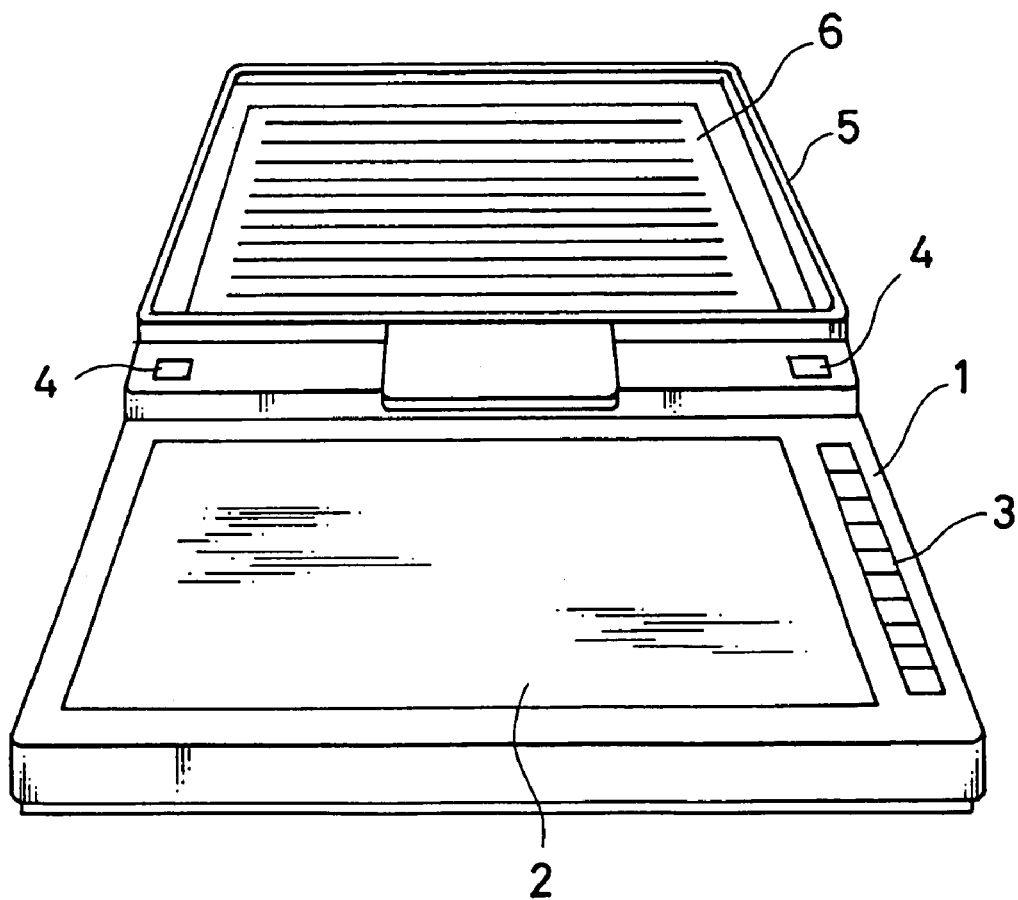
FIG. 1 is a perspective view showing the general outer appearance of the thin portable book in one embodiment of the present invention.
Figure 2:
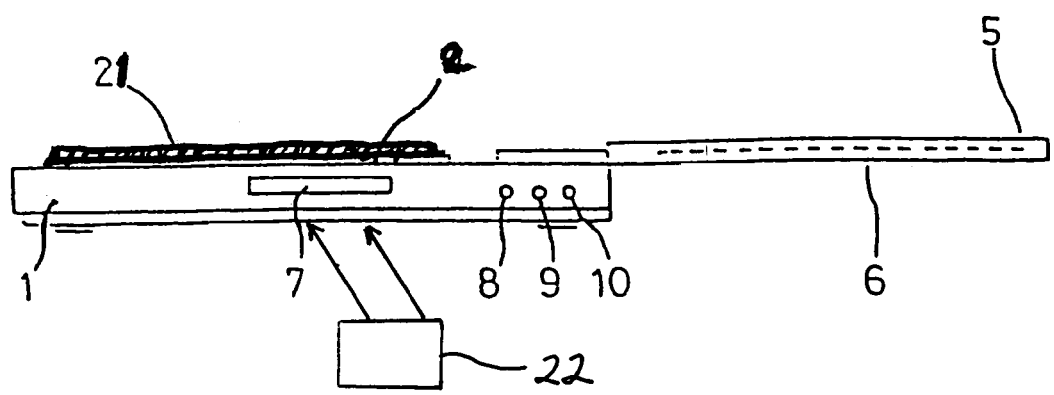
FIG. 2 is a side elevational view of the thin portable book of FIG. 1.

Now referring to FIG. 1 and FIG. 2, a read-out apparatus 1 of a thin portable book comprises a display section 2, an external input keyboard 3, a rotatable shaft 4, a cover 5, a solar cell module 6 for a power source, attached to the cover 5, a data read-out device 7, an external power input terminal 8 and a pair of external input terminals 9, 10.

In this embodiment of the present invention, a ferroelectric liquid crystal display is used for the display device 2, and a cassette-type EPROM 22 is used for the freely detachable recording medium. This EPROM is a non-volatile type recording medium in which the contents of a book are recorded in the form of coded signal. The solar cell module is comprised of an amorphous silicon solar cell having a size of a 200 mm×300 mm.

With a conventional TN-type or STN-type of liquid crystal display, it is necessary to continuously apply a liquid crystal display drive signal at the rate of 30 to 60 times per second in order to read out and display the alphanumeric characters, symbols, images, and the like which make up the contents of the book. Reducing the number of signals per second causes a flicker to appear in the display, making it difficult to read the book.

Furthermore, in the case that the some drive signals are applied to the liquid crystals only when the display image is being changed and not applied after that, no display appears making no sense. Thus, frequent display drive signals must be applied to the liquid crystals in the TN and STN types of liquid crystal display to continue the image display, resulting in the drawback that the power consumption is high.

As opposed to this, with a ferroelectric liquid crystal display, each time a different drive signal is applied to the liquid crystals, the image display changes. When a drive signal is not applied to the liquid crystals, the image display does not change but instead continues, so that it is not necessary to further apply the drive signal, and therefore power consumption is low.

Figure 4:
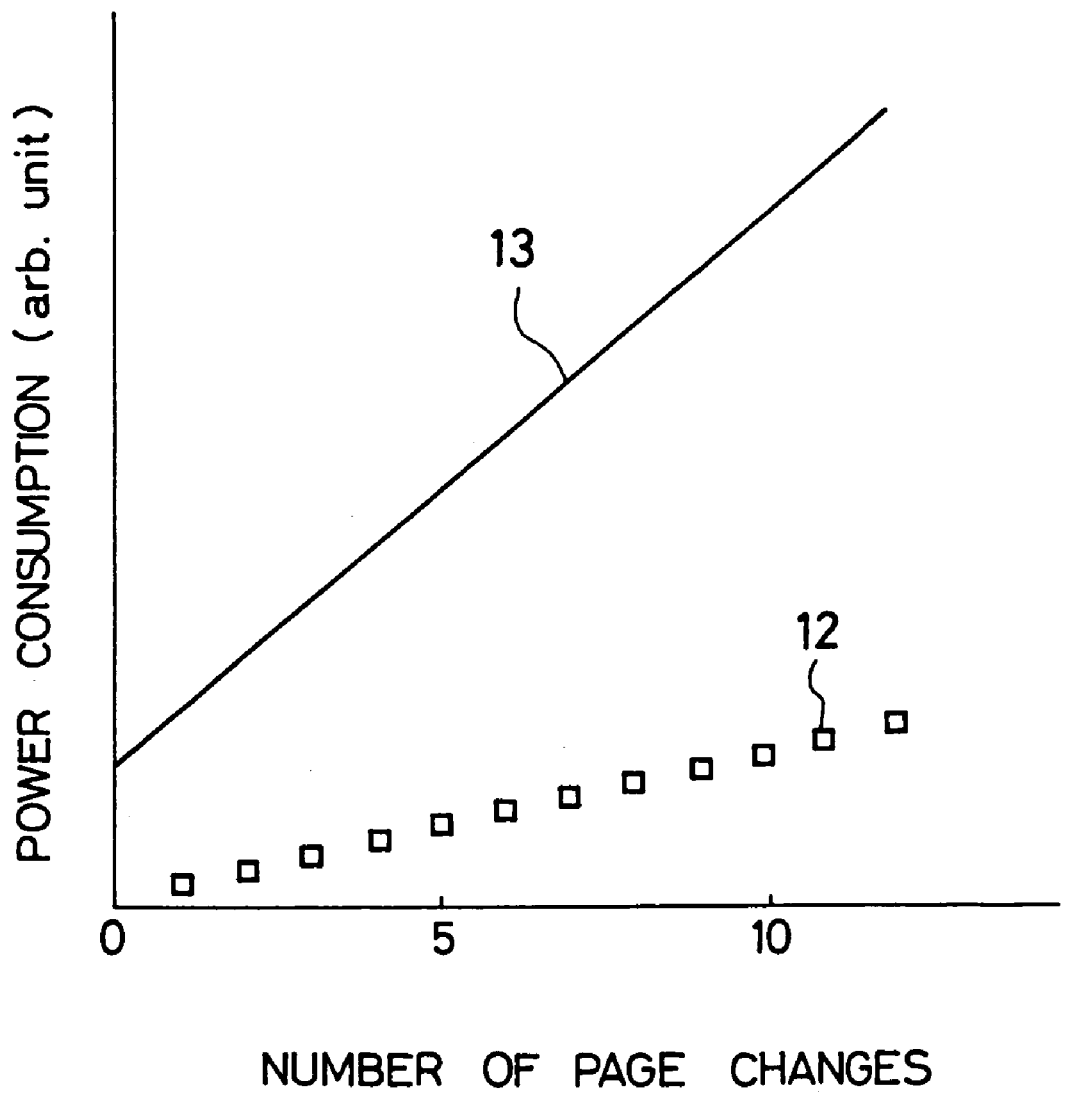
FIG. 4 is a graph comparing the power consumption of a conventional liquid crystal display system with the power consumption of the ferroelectric liquid crystal display in one embodiment of the present invention.

FIG. 4 is a graph comparing the ferroelectric liquid crystal display system of this embodiment with the conventional liquid crystal display system in power consumption, wherein the image display is changed every 45 seconds. The dotted line 12 represents this embodiment while the solid line 13 represents the conventional system. This clearly shows that the power consumption of the present invention is lower than that of the conventional system.

The display of the book by the ferroelectric liquid crystal display of this embodiment can contain 50 characters by 30 lines in lateral display. The reader presses the "next page", "previous page", "scroll key" and the like on the external input keyboard 3 as required, to go from the page or display currently being displayed to another page or display. A new page or display thus displayed continues until the next drive signal is applied to the ferroelectric liquid crystals, so that the image is in a static condition and there is no flickering problem. Used for the ferroelectric liquid crystal display in the present invention is a liquid crystal which has a ferroelectric property in the temperature range of 0° C. to 70° C., and has an A4 size containing 720×480 dots.

Figure 5:
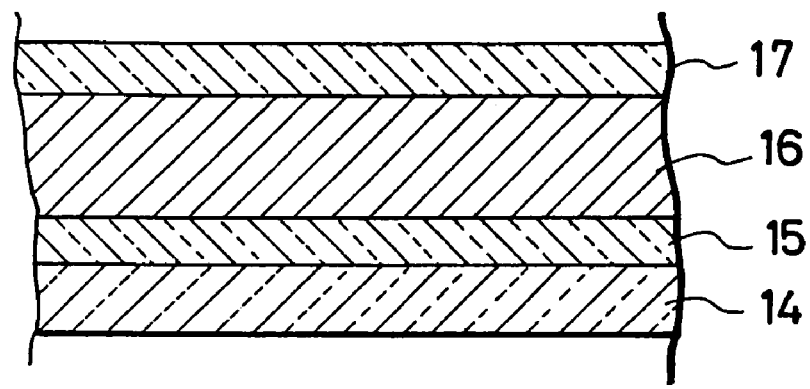
FIG. 5 is a schematic view of the solar cell in one embodiment of the present invention.

FIG. 5 is a cross sectional view showing the solar cell used in this embodiment of the present invention. In the drawing, the solar cell comprises a translucent or transparent substrate 14, a first transparent conductive film 15, an amorphous silicon semiconductor layer 16, and a second transparent conductive film in a laminated structure. The translucent or transparent substrate 14 is made of, for example, glass, plastic or the like and the first transparent conductive film 15 is made of, for example, ITO, $SnO_2$, ZnO or a lamination thereof and formed on the translucent or transparent substrate 14. The first transparent conductive film 15 functions as a base electrode, on the surface of which the amorphous silicon semiconductor layer 16 with a PIN junction is formed by a commonly known plasma CVD method. In addition, the second transparent conductive film 17 is formed on the surface of the layer 16 and constructed as a reverse side electrode. At this time, 25 stages of elements are formed in series on a 200 mm×300 mm substrate by a laser process. A slight difference in output from this solar cell module can be observed according to the intensity of the light, but whether indoors or outdoors, it can supply adequate power to drive the thin portable book. Also, because the substrate and the upper and lower electrodes are transparent, light from both the upper and lower surfaces strikes the amorphous silicon semiconductor layer.

Again referring to FIG. 1, the cover 5 is mounted to a section of the read-out apparatus 1 containing the display section 2 and the external input keyboard 3 through the rotatable shaft A. The cover 5 is opened and closed by rotation around the rotatable shaft 4. The solar cell module 6 is provided generally over the entire surface of the cover 5. Because the substrate 14 and both the upper and lower electrodes 15, 17 of the solar cell module 6 are transparent, when the cover 5 is closed, the light strikes on the outside of the solar cell to generate electricity in the solar cell, and when the cover 5 is open, the light strikes on the inside of the solar cell to generate electricity in the solar cell. Incidentally, the solar cell substrate 14 and the upper and lower electrodes 15, 17 do not have to be completely transparent—semitransparency is satisfactory. However, the higher the degree of transparency the better, as a greater quantity of electrical power will be generated by the solar cell.

Further, solar cells are provided in positions on the surface of the read-out apparatus where nothing is used, so that a larger amount of electricity can be generated.

A cassette-type EPROM is installed in a thin portable book which has ferroelectric liquid crystals and a solar cell module of the type outlined above. The data stored in the EPROM is read out by the read-out function of the present invention before being decoded or converted. The data is then displayed on the ferroelectric liquid crystal display in the form of alphanumeric characters, symbols, images and the like. At this time, the read-out function and the display function are activated from the external input keyboard 3. The ferroelectric liquid crystal display is characterized in that it is thin and light, and that, in addition to providing low power consumption, it is less tiring on the eyes than a CRT display, even if used for a long period.

Figure 6:
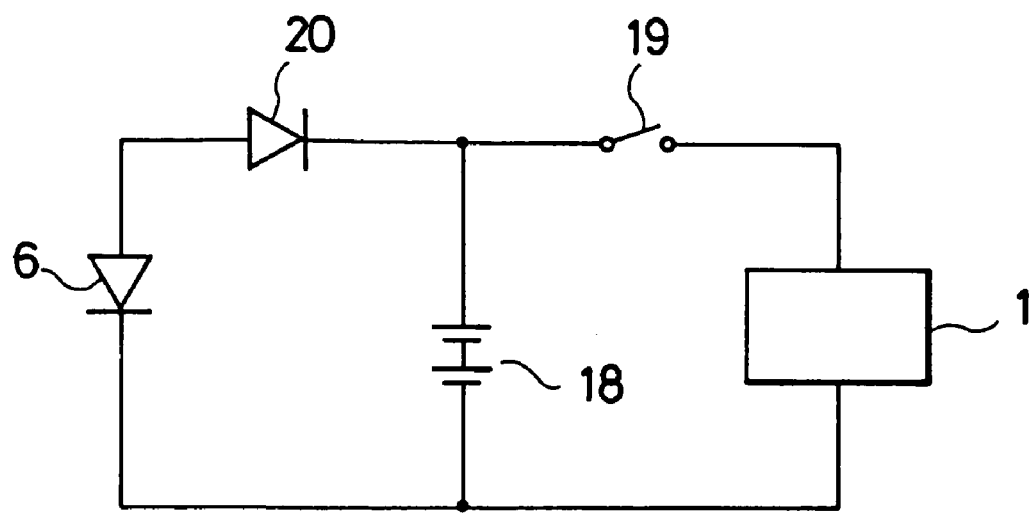
FIG. 6 is an electric circuit provided in the thin portable book of FIG. 1.

Now referring to FIG. 6, a switch 19 provided in the thin portable book of this embodiment is turned OFF by means of a cam mechanism linked to the rotatable shaft 4 (see FIG. 1) when the cover 5 is closed, and the electricity generated by the solar cell module 6 is charged into a charging device 18. When the cover 5 is opened, the switch 19 is turned ON.

The electrical power stored in the charging device 18 is fed to the read-out apparatus 1, so that the read-out apparatus 1 is activated. Specifically, in the present invention, when the cover is closed, the power supply to the read-out apparatus is automatically turned off. This mechanism acts to prevent the power stored in the charging device 18 from being wastefully used until the cover 5 is next opened. Also, a mechanism is provided in the read-out apparatus 1 to turn off the power when the cover 5 is opened. A rectifier 20 is provided to prevent reverse power flow.

The thin portable book of the above-outlined configuration is small and light, and has a low power consumption. It is possible to take both of the read-out apparatus and the freely detachable recording medium outdoors to read the book out of doors.

In addition, the reader can possess one read-out apparatus and a plurality of EPROM cassettes which can be simply exchanged in the read-out apparatus. This is equivalent to owing many volumes of books. Generally one EPROM cassette weighs about 10 gm to 30 gm, so that it is not necessary to provide for a larger storage and shipment for a large volume of books.

Further, if the read-out system for the read-out apparatus is made uniform, whereby a uniform standard is set, so that it is made possible to read such a book on any read-out apparatus, the provision of one desk integrated with a read-out apparatus for each pupil at the educational site, such as a school or the like, would mean that the student would no longer have to carry many volumes of heavy books back and forth to school, but instead could carry several EPROM cassettes, each weighing only about 10 gm to 30 gm.

Embodiment No. 2

In this embodiment of the present invention, a card-type EPROM is used as the freely detachable recording medium.

In this embodiment, a temporary recording region is provided in the read-out apparatus, and several pages or displays of data stored on an EPROM card are read out at one time by the read-out means and recorded in the temporary recording region. By activating the external input key, the data on the single page or display in the temporary recording region which the reader would like to see, is displayed on a ferroelectric liquid crystal display in the form of alphanumeric characters, symbols, images, and the like.

Different pages or displays can be read out in the same way as reading a normal book.

Also, by using a liquid crystal display device in which sensors 21 are positioned in matrix form on the display section 2, the part of the displayed image which is important to the reader can be indicated by a touch pen or light pen 22 or the like, and this important part can be recorded in the temporary recording region. Then, using a microcomputer 11 shown in FIG. 3, when this important part is displayed, it can be underlined or displayed in characters formed with the white dots in a black background. By this means, the same effect is obtained as when underlining a section in a normal paper book or when emphasizing that section with a fluorescent pen.

In all other respects, this embodiment is substantially identical to Embodiment No. 1.

Since other modification and changes (varied to fit particular operating requirements and environments) will be apparent to those skilled in the art, the invention is not considered limited to the examples chosen for purposes of disclosure, and covers all changes and modifications which do not constitute departures from the true spirit and scope of this invention.

What is claimed is:

1. A portable electronic device comprising:
   a housing;
   a microcomputer in said housing;
   a first memory in said housing;
   a temporary memory in said housing capable of temporarily storing data supplied thereto from said first memory;
   a liquid crystal display panel operationally connected to said microcomputer,
   a sensor juxtaposed to said liquid crystal display panel,
   wherein multiple pages which are stored in said temporary memory can be simultaneously displayed on said liquid crystal display panel,
   wherein a portion of a displayed information which is highlighted through said sensor can be stored in said temporary memory, and when said portion is again displayed, the highlight remains provided on said portion.

2. A portable electronic device according to claim 1, wherein said device is a portable book.

3. A portable electronic device according to claim 1, wherein said liquid crystal display panel comprises a ferroelectric liquid crystal.

4. The portable electronic device according to claim 1 further comprising a solar cell for supplying an electric power.

5. The portable electronic device according to claim 1 wherein said first memory is at least one of a magnetic disc, optical disc, and EPROM.

6. The portable electronic device according to claim 1 wherein said portion of the displayed information is highlighted by an underline.

7. A portable electronic device comprising:
a housing;
a microcomputer in said housing;
a first memory in said housing;
a temporary memory capable of temporarily storing data supplied thereto from said first memory;
a liquid crystal display panel operationally connected to said microcomputer; and
a sensor operationally connected to said liquid crystal display panel,
wherein multiple pages which are stored in said temporary memory can be simultaneously displayed on said liquid crystal display panel,
wherein a highlight which is provided on a portion of a displayed information through said sensor can be stored in said temporary memory, and
wherein when said portion is again displayed, the highlight remains provided on said portion.

8. A portable electronic device according to claim 7, wherein said device is a portable book.

9. A portable electronic device according to claim 7, wherein an amount of the data which can be stored in the temporary memory is greater than the amount of data which can be displayed by said liquid crystal display panel.

10. The portable electronic device according to claim 7 further comprising a solar cell for supplying an electric power.

11. The portable electronic device according to claim 7 wherein said first memory is at least one of a magnetic disc, optical disc, and EPROM.

12. The portable electronic device according to claim 7 wherein said highlight comprises an underline.

13. A portable electronic device comprising:
a housing;
a microcomputer in said housing;
a read-out device in said housing for reading out an information stored in a first memory in said housing;
a temporary memory capable of temporarily storing data supplied thereto from said first memory in said housing;
input keys operationally connected to said microcomputer; and
a liquid crystal display panel operationally connected to said microcomputer; and
a sensor juxtaposed to said liquid crystal display panel,
wherein multiple image displays of said data which are stored in said temporary memory can be simultaneously displayed on said liquid crystal display panel, and
wherein a highlight which is provided on a portion of a displayed information through said sensor can be stored in said temporary memory, and
wherein when said portion is again displayed, the highlight remains provided on said portion.

14. The portable electronic device according to claim 13 further comprising a solar cell for supplying an electric power.

15. The portable electronic device according to claim 13 wherein said first memory is at least one of a magnetic disc, optical disc, and EPROM.

16. A portable electronic device comprising;
a housing;
a microcomputer in said housing;
a read-out device in said housing for reading out an information;
a temporary memory capable of temporarily storing data;
input keys operationally connected to the microcomputer; and
a liquid crystal display panel operationally connected to the microcomputer; and
a sensor operationally connected to said liquid crystal display panel,
wherein multiple pages which are stored in said temporary memory can be simultaneously displayed on said liquid crystal display panel, and
wherein a highlight which is provided on a portion of a displayed information through said sensor can be stored in said temporary memory,
wherein when said portion is again displayed, the highlight remains provided on said portion.

17. A portable electronic device according to claim 16, wherein an amount of the data which can be stored in the temporary memory is greater than the amount of data which can be displayed by said liquid crystal display panel.

18. A portable electronic device comprising:
a housing;
a microcomputer in said housing;
a temporary memory in said housing for storing information;
a liquid crystal display panel operationally connected to said microcomputer;
a sensor through which a portion of a displayed information to be highlighted can be designated by a user of the portable electronic device;
wherein multiple pages which are stored in said temporary memory can be simultaneously displayed on said liquid crystal display panel, and
wherein the portion of the displayed information which is highlighted through said sensor can be stored in said temporary memory, and when said portion is again displayed, the highlight remains provided on said portion.

19. The portable electronic device according to claim 18 further comprising a display medium having memory characteristics such that an image display on the display panel remains unchanged during a period when a display drive signal is not applied to the display panel.

20. The portable electronic device according to claim 19 wherein the display medium comprises a ferroelectric liquid crystal material.

21. A portable electronic device comprising:
a housing;
a microcomputer in said housing;
a first memory in said housing;
a temporary memory in said housing capable of temporarily storing data supplied thereto from said first memory;
a display panel operationally connected to said microcomputer,
a sensor juxtaposed to said display panel,
wherein multiple pages which are stored in said temporary memory can be simultaneously displayed on said display panel,
wherein a portion of a displayed information which is highlighted through said sensor can be stored in said temporary memory, and when said portion is again displayed, the highlight remains provided on said portion.

22. The portable electronic device according to claim 21, wherein said device is a portable book.

23. The portable electronic device according to claim 21 further comprising a solar cell for supplying an electric power.

24. The portable electronic device according to claim 21 wherein said first memory is at least one of a magnetic disc, optical disc, and EPROM.

25. The portable electronic device according to claim 21 wherein said portion of the displayed information is highlighted by an underline.

26. A portable electronic device comprising:
a housing;
a microcomputer in said housing;
a first memory installed in said housing;
a temporary memory capable of temporarily storing data supplied thereto from said first memory;
input keys operationally connected to said microcomputer; and
a display panel operationally connected to said microcomputer; and
a sensor juxtaposed to said display panel,
wherein multiple pages which are stored in said temporary memory can be simultaneously displayed on said display panel,
wherein a highlight which is provided on a portion of a displayed information through said sensor can be stored in said temporary memory,
wherein when said portion is again displayed, the highlight remains provided on said portion.

27. The portable electronic device according to claim 26, wherein said device is a portable book.

28. The portable electronic device according to claim 26, wherein an amount of the data which can be stored in the temporary memory is greater than the amount of data which can be displayed by said display panel.

29. The portable electronic device according to claim 26 further comprising a solar cell for supplying an electric power.

30. The portable electronic device according to claim 26 wherein said first memory is at least one of a magnetic disc, optical disc, and EPROM.

31. The portable electronic device according to claim 26 wherein said highlight comprises an underline.

32. A portable electronic device comprising:
a housing;
a microcomputer in said housing;
a read-out device in said housing for reading out an information stored in a first memory in said housing;
a temporary memory capable of temporarily storing data supplied thereto from said first memory in said housing;
a display panel operationally connected to said microcomputer; and
a sensor operationally connected to said display panel,
wherein multiple image displays of data which are stored in said temporary memory can be simultaneously displayed on said display panel, and
wherein a portion of a displayed information which is highlighted through said sensor can be stored in said temporary memory, when said portion is again displayed, the highlight remains provided on said portion.

33. The portable electronic device according to claim 32 further comprising a solar cell for supplying an electric power.

34. The portable electronic device according to claim 32 wherein said first memory is at least one of a magnetic disc, optical disc, and EPROM.

35. A portable electronic device comprising;
a housing;
a microcomputer in said housing;
a read-out device in said housing for reading out an information;
a temporary memory capable of temporarily storing data supplied thereto from said read-out device;
a display panel operationally connected to said microcomputer; and
a sensor through which a portion of a displayed information to be highlighted can be designated by a user of the portable electronic device;
wherein multiple pages which are stored in said temporary memory can be simultaneously displayed on said display panel, and
wherein a highlight which is provided on the portion of the displayed information through said sensor can be stored in said temporary memory, and
wherein when said portion is again displayed, said highlight remains provided on said portion.

36. A portable electronic device according to claim 35, wherein an amount of the data which can be stored in the temporary memory is greater than the amount of data which can be displayed by said display panel.

37. A portable electronic device comprising:
a housing;
a microcomputer in said housing;
a first memory in said housing;
a temporary memory in said housing capable of temporarily storing data supplied thereto from said first memory;
input keys operationally connected to said microcomputer; and
a display panel operationally connected to said microcomputer,
a sensor operationally connected to said display panel,
wherein multiple image displays of said data which are stored in said temporary memory can be simultaneously displayed on said display panel,
wherein a portion of a displayed information which is highlighted through said sensor can be stored in said temporary memory, and when said portion is again displayed, the highlight remains provided on said portion.

38. The portable electronic device according to claim 37, wherein said device is a portable book.

39. The portable electronic device according to claim 37 further comprising a solar cell for supplying an electric power.

40. The portable electronic device according to claim 37 wherein said first memory is at least one of a magnetic disc, optical disc, and EPROM.

41. The portable electronic device according to claim 37 wherein said portion of the displayed information is highlighted by an underline.

42. The portable electronic device of claim 37 wherein said display panel comprises a liquid crystal.

43. The portable electronic device of claim 42 wherein said liquid crystal comprises a ferroelectric liquid crystal.

44. A portable electronic device comprising:
a housing;
a microcomputer in said housing;
a first memory in said housing;
a temporary memory capable of temporarily storing data supplied thereto from said first memory;
input keys operationally connected to said microcomputer; and a display panel operationally connected to said microcomputer; and a sensor through which a portion of a displayed information to be highlighted can be designated by a user of the portable electronic device;

wherein multiple image displays of said data which are stored in said temporary memory can be simultaneously displayed on said display panel, wherein the highlight which is provided on the portion of the displayed information through said sensor can be stored in said temporary memory, when said portion is again displayed, the highlight remains provided on said portion.

45. The portable electronic device according to claim 44, wherein said device is a portable book.

46. The portable electronic device according to claim 44, wherein an amount of the data which can be stored in the temporary memory is greater than the amount of data which can be displayed by said display panel.

47. The portable electronic device according to claim 44 further comprising a solar cell for supplying an electric power.

48. The portable electronic device according to claim 44 wherein said first memory is at least one of a magnetic disc, optical disc, and EPROM.

49. The portable electronic device according to claim 44 wherein said highlight comprises an underline.

50. The portable electronic device according to claim 44 wherein said display panel comprises a liquid crystal.

51. The portable electronic device according to claim 50 wherein said liquid crystal comprises a ferroelectric liquid crystal.

52. A portable electronic device comprising:

a housing;

a microcomputer in said housing;

a temporary memory in said housing capable of storing information;

a display panel operationally connected to said microcomputer;

a sensor operationally connected to said display panel;

wherein multiple image displays of said information which are stored in said temporary memory can be simultaneously displayed on said display panel, and wherein a highlight which is provided on a portion of a displayed information through said sensor can be stored in said temporary memory, and wherein when said portion is again displayed, the highlight remains provided on said portion.

53. A portable electronic device comprising:

a housing;

a microcomputer in said housing;

a temporary memory in said housing capable of storing information;

a liquid crystal display panel operationally connected to said microcomputer;

a sensor juxtaposed to the liquid crystal display panel;

wherein the liquid crystal display panel is capable of continuing to display an image after applying a display drive signal for the image until a next display drive signal is applied when the display drive signal is applied to the liquid crystal display panel less than 30 times per second; and wherein a portion of a displayed information which is highlighted through the sensor by a user of the portable electronic device can be stored in said temporary memory, and wherein when said portion is again displayed, said highlight remains provided on said portion.

54. The portable electronic device according to claim 53, wherein an amount of data which can be stored in said temporary memory is greater than the amount of data which can be displayed by said liquid crystal display panel.

55. The portable electronic device according to claim 53, wherein said device is a portable book.

56. A portable electronic device comprising:

a housing;

a microcomputer in said housing;

a temporary memory in said housing capable of storing information;

a display panel operationally connected to said microcomputer; and a sensor juxtaposed to the display panel, wherein the display panel is capable of continuing to display an image for at least 45 seconds even without applying a display drive signal for the image after applying the display drive signal;

wherein a highlight which is provided on a portion of a displayed information through the sensor by a user of the portable electronic device can be stored in said temporary memory, wherein when said portion is again displayed, the highlight remains provided on said portion.

57. The portable electronic device according to claim 56, wherein an amount of data which can be stored in said temporary memory is greater than the amount of data which can be displayed by said display panel.

58. The portable electronic device according to claim 53, wherein said device is a portable book.

59. A portable electronic device comprising:

a housing;

a microcomputer in said housing;

a non-volatile semiconductor memory capable of storing contents of a book, in said housing;

a temporary memory in said housing capable of temporarily storing data supplied thereto from said non-volatile semiconductor memory;

a liquid crystal display panel operationally connected to said microcomputer; and a sensor operationally connected to the liquid crystal display panel;

wherein the display panel is capable of continuing to display an image after applying a display drive signal for the image until a next display drive signal is applied when the display drive signal is applied to the display panel less than 30 times per second;

wherein multiple pages which are stored in said temporary memory can be simultaneously displayed on said liquid crystal display panel, wherein a portion of a displayed information which is highlighted through the sensor by a user of the portable electronic device can be stored in said temporary memory, and when said portion is again displayed, said highlight remains provided on said portion.

60. The portable electronic device according to claim 59, wherein said non-volatile semiconductor memory is EPROM.

61. The portable electronic device according to claim 59, wherein an amount of data which can be stored in said temporary memory is greater than the amount of data which can be displayed by said liquid crystal display panel.

62. The portable electronic device according to claim 59, wherein said device is a portable book.

63. A portable electronic device comprising:
a housing;
a microcomputer in said housing;
a non-volatile semiconductor memory capable of storing contents of a book, in said housing;
a temporary memory capable of temporarily storing data supplied thereto from said non-volatile semiconductor memory;
a liquid crystal display panel operationally connected to said microcomputer; and
a sensor operationally connected to the liquid crystal display panel;
wherein the display panel is capable of continuing to display an image for at least 45 seconds even without applying a display drive signal for the image after applying the display drive signal;
wherein multiple pages which are stored in said temporary memory can be simultaneously displayed on said liquid crystal display panel,
wherein a highlight which is provided on a portion of a displayed information through the sensor by a user of the portable electronic device can be stored in said temporary memory,
wherein when said portion is again displayed, the highlight remains provided on said portion.

64. The portable electronic device according to claim 63, wherein said non-volatile semiconductor memory is EPROM.

65. The portable electronic device according to claim 63, wherein an amount of data which can be stored in said temporary memory is greater than the amount of data which can be displayed by said liquid crystal display panel.

66. The portable electronic device according to claim 63, wherein said device is a portable book.

67. A portable electronic device comprising:
a housing;
a microcomputer in said housing;
a non-volatile semiconductor memory capable of storing contents of a book, in said housing;
a temporary memory in said housing capable of temporarily storing data supplied thereto from said non-volatile semiconductor memory;
a display panel operationally connected to said microcomputer; and
a sensor through which a portion of a displayed information to be highlighted can be designated by a user of the portable electronic device;
wherein the display panel is capable of continuing to display an image after applying a display drive signal for the image until a next display drive signal is applied when the display drive signal is applied to the display panel less than 30 times per second;
wherein multiple pages which are stored in said temporary memory can be simultaneously displayed on said display panel,
wherein the portion of the displayed information which is highlighted through the sensor by the user of the portable electronic device can be stored in said temporary memory, and when said portion is again displayed, the highlight remains provided on said portion.

68. The portable electronic device according to claim 67, wherein said non-volatile semiconductor memory is EPROM.

69. The portable electronic device according to claim 67, wherein an amount of data which can be stored in said temporary memory is greater than the amount of data which can be displayed by said display panel.

70. The portable electronic device according to claim 67, wherein said device is a portable book.

71. A portable electronic device comprising:
a housing;
a microcomputer in said housing;
a non-volatile semiconductor memory capable of storing contents of a book, in said housing;
a temporary memory capable of temporarily storing data supplied thereto from said non-volatile semiconductor memory;
a display panel operationally connected to said microcomputer, wherein the display panel is such that an image display on the display panel remains unchanged during a period when a display drive signal is not applied to the display panel; and
a sensor juxtaposed to the display panel,
wherein multiple pages which are stored in said temporary memory can be simultaneously displayed on said display panel,
wherein a highlight which is provided on a portion of a displayed information through the sensor by a user of the portable electronic device can be stored in said temporary memory,
wherein when said portion is again displayed, said highlight remains provided on said portion.

72. The portable electronic device according to claim 71, wherein said non-volatile semiconductor memory is EPROM.

73. The portable electronic device according to claim 71, wherein an amount of data which can be stored in said temporary memory is greater than the amount of data which can be displayed by said display panel.

74. The portable electronic device according to claim 71, wherein said device is a portable book.

75. A portable electronic device comprising:
a housing;
a microcomputer in said housing;
a non-volatile semiconductor memory capable of storing contents of a book, in said housing;
a temporary memory in said housing capable of temporarily storing data supplied thereto from said non-volatile semiconductor memory;
a display panel operationally connected to said microcomputer, wherein the display panel is such that an image display on the display panel remains unchanged during a period when a display drive signal is not applied to the display panel; and
a sensor operationally connected to the display panel;
wherein a portion of a displayed information which is highlighted through the sensor by a user of the portable electronic device can be stored in said temporary memory, and when said portion is again displayed, said highlight remains provided on said portion.

76. The portable electronic device according to claim 75, wherein said non-volatile semiconductor memory is EPROM.

77. The portable electronic device according to claim 75, wherein an amount of data which can be stored in said temporary memory is greater than the amount of data which can be displayed by said display panel.

78. The portable electronic device according to claim 75, wherein said device is a portable book.

79. A portable electronic device comprising:
a housing;
a microcomputer in said housing;
a non-volatile semiconductor memory capable of storing contents of a book, in said housing;

a temporary memory capable of temporarily storing data supplied thereto from said non-volatile semiconductor memory;

a display panel operationally connected to said microcomputer; and a sensor through which a portion of a displayed information to be highlighted can be designated by a user of the portable electronic device, wherein the display panel is capable of continuing to display an image for at least 45 seconds even without applying a display drive signal for the image after applying the display drive signal;

wherein a highlight which is provided on the portion of the displayed information through the sensor by the user of the portable electronic device can be stored in said temporary memory, and wherein when said portion is again displayed, said highlight remains provided on said portion.

80. The portable electronic device according to claim 79, wherein said non-volatile semiconductor memory is EPROM.

81. The portable electronic device according to claim 79, wherein an amount of data which can be stored in said temporary memory is greater than the amount of data which can be displayed by said display panel.

82. The portable electronic device according to claim 79, wherein said device is a portable book.

83. A portable electronic device comprising:
a housing;
a microcomputer in said housing;
a first memory in said housing;
a temporary memory in said housing capable of temporarily storing data supplied thereto from said first memory;
a liquid crystal display panel operationally connected to said microcomputer, wherein the liquid crystal display panel is such that an image display on the liquid crystal display panel remains unchanged during a period when a display drive signal is not applied to the liquid crystal display panel; and
a sensor juxtaposed to the liquid crystal display panel,
wherein multiple pages which are stored in said temporary memory can be simultaneously displayed on said liquid crystal display panel,
wherein a portion of a displayed information which is highlighted through the sensor by a user of the portable electronic device can be stored in said temporary memory, and when said portion is again displayed, said highlight remains provided on said portion.

84. The portable electronic device according to claim 83, wherein said first memory is at least one of a magnetic disc, optical disc and EPROM.

85. The portable electronic device according to claim 83, wherein an amount of data which can be stored in said temporary memory is greater than the amount of data which can be displayed by said liquid crystal display panel.

86. The portable electronic device according to claim 83, wherein said device is a portable book.

87. A portable electronic device comprising:
a housing;
a microcomputer in said housing;
a first memory in said housing;
a temporary memory capable of temporarily storing data supplied thereto from said first memory;
a liquid crystal display panel operationally connected to said microcomputer; and
a sensor juxtaposed to the liquid crystal display panel, wherein the liquid crystal display panel is capable of continuing to display an image for at least 45 seconds even without applying a display drive signal for the image after applying the display drive signal;

wherein multiple pages which are stored in said temporary memory can be simultaneously displayed on said liquid crystal display panel, wherein a highlight which is provided on a portion of a displayed information through the sensor by a user of the portable electronic device can be stored in said temporary memory, and wherein when said portion is again displayed, said highlight remains provided on said portion.

88. The portable electronic device according to claim 87, wherein said first memory is at least one of a magnetic disc, optical disc and EPROM.

89. The portable electronic device according to claim 87, wherein an amount of data which can be stored in said temporary memory is greater than the amount of data which can be displayed by said liquid crystal display panel.

90. The portable electronic device according to claim 87, wherein said device is a portable book.

91. The portable electronic device according to claim 87 further comprising input keys operationally connected to said microcomputer.

92. The portable electronic device according to claim 87 wherein said portion of the displayed information is highlighted by an underline.

93. The portable electronic device according to claim 87 wherein said portion of the displayed information is highlighted by displaying in characters formed with white dots in a black background.

94. A portable electronic device comprising:
a housing;
a microcomputer in said housing;
a first memory in said housing;
a temporary memory in said housing capable of temporarily storing data supplied thereto from said first memory; and
a display panel operationally connected to said microcomputer, wherein the display panel is capable of continuing to display an image after applying a display drive signal for the image until a next display drive signal is applied when the display drive signal is applied to the display panel less than 30 times per second; and
a sensor operationally connected to the display panel;
wherein multiple pages which are stored in said temporary memory can be simultaneously displayed on said display panel,
wherein a portion of a displayed information which is highlighted through the sensor by a user of the portable electronic device can be stored in said temporary memory, and when said portion is main displayed, said highlight remains provided on said portion.

95. The portable electronic device according to claim 94, wherein said first memory is at least one of a magnetic disc, optical disc and EPROM.

96. The portable electronic device according to claim 94, wherein an amount of data which can be stored in said temporary memory is greater than the amount of data which can be displayed by said display panel.

97. The portable electronic device according to claim 94, wherein said device is a portable book.

98. The portable electronic device according to claim 94 wherein the display panel is capable of continuing to display an image after applying a display drive signal for the image until a next display drive signal for a different image is applied.

99. The portable electronic device according to claim 94 wherein the data is set a uniform standard.

100. The portable electronic device according to claim 94 wherein the display panel is capable of display a data which is set a uniform standard.

101. A portable electronic device comprising:
a housing;
a microcomputer in said housing;
a first memory in said housing;
a temporary memory capable of temporarily storing data supplied thereto from said first memory;
a display panel operationally connected to said microcomputer, wherein the display panel is capable of continuing to display an image for at least 45 seconds even without applying a display drive signal for the image after applying the display drive signal; and
a sensor through which a portion of a displayed information to be highlighted can be designated by a user of the portable electronic device,
wherein multiple pages which are stored in said temporary memory can be simultaneously displayed on said display panel,
wherein a highlight which is provided on the portion of the displayed information through the sensor by a user of the portable electronic device can be stored in said temporary memory, and
wherein when said portion is again displayed, said highlight remains provided on said portion.

102. The portable electronic device according to claim 101, wherein said first memory is at least one of a magnetic disc, optical disc and EPROM.

103. The portable electronic device according to claim 101, wherein an amount of data which can be stored in said temporary memory is greater than the amount of data which can be displayed by said display panel.

104. The portable electronic device according to claim 101, wherein said device is a portable book.

105. The portable electronic device according to claim 101 wherein the display panel is capable of continuing to display an image after applying a display drive signal for the image until a next display drive signal for a different image is applied.

106. The portable electronic device according to claim 101 wherein the data is set a uniform standard.

107. The portable electronic device according to claim 101 wherein the display panel is capable of display a data which is set a uniform standard.

108. A portable electronic device comprising:
a housing;
a microcomputer in said housing;
a first memory in said housing;
a temporary memory in said housing capable of temporarily storing data supplied thereto from said first memory;
input keys operationally connected to the microcomputer;
a display panel operationally connected to said microcomputer; and
a sensor juxtaposed to the display panel,
wherein the display panel is capable of continuing to display an image after applying a display drive signal for the image until a next display drive signal is applied when the display drive signal is applied to the display panel less than 30 times per second;
wherein a portion of a displayed information which is highlighted by a user of the portable electronic device can be stored in said temporary memory, and wherein when said portion is again displayed, said highlight remains provided on said portion.

109. The portable electronic device according to claim 108, wherein said first memory is at least one of a magnetic disc, optical disc and EPROM.

110. The portable electronic device according to claim 108, wherein an amount of data which can be stored in said temporary memory is greater than the amount of data which can be displayed by said display panel.

111. The portable electronic device according to claim 108, wherein said device is a portable book.

112. A portable electronic device comprising:
a housing;
a microcomputer in said housing;
a first memory in said housing;
a temporary memory capable of temporarily storing data supplied thereto from said first memory;
a display panel operationally connected to said microcomputer; and
a sensor operationally connected to the display panel,
wherein the display panel is capable of continuing to display an image for at least 45 seconds even without applying a display drive signal for the image after applying the display drive signal;
wherein multiple image displays of said data which are stored in said temporary memory can be simultaneously displayed on said display panel,
wherein a highlight which is provided on a portion of a displayed information through the sensor by a user of the portable electronic device can be stored in said temporary memory, and
wherein when said portion is again displayed, said highlight remains provided on said portion.

113. The portable electronic device according to claim 112, wherein said first memory is at least one of a magnetic disc, optical disc and EPROM.

114. The portable electronic device according to claim 112, wherein an amount of data which can be stored in said temporary memory is greater than the amount of data which can be displayed by said display panel.

115. The portable electronic device according to claim 112, wherein said device is a portable book.

116. A portable electronic device comprising:
a housing;
a microcomputer in said housing;
a read-out device in said housing for reading out an information stored in a first memory in said housing;
a temporary memory capable of temporarily storing data supplied thereto from said first memory in said housing;
a liquid crystal display panel operationally connected to said microcomputer; and
a sensor juxtaposed to the display panel,
wherein the liquid crystal display panel is capable of continuing to display an image after applying a display drive signal for the image until a next display drive signal is applied when the display drive signal is applied to the liquid crystal display panel less than 30 times per second;
wherein a highlight which is provided on a portion of a displayed information through the sensor by a user of the portable electronic device can be stored in said temporary memory, and
wherein when said portion is again displayed, said highlight remains provided on said portion.

117. The portable electronic device according to claim 116, wherein said first memory is at least one of a magnetic disc, optical disc and EPROM.

118. The portable electronic device according to claim 116, wherein an amount of data which can be stored in said temporary memory is greater than the amount of data which can be displayed by said liquid crystal display panel.

119. The portable electronic device according to claim 116, wherein said device is a portable book.

120. A portable electronic device comprising;
a housing;
a microcomputer in said housing;
a read-out device in said housing for reading out an information;
a temporary memory capable of temporarily storing data supplied thereto from a first memory;
a liquid crystal display panel provided operationally connected to said microcomputer; and
a sensor through which a portion of a displayed information to be highlighted can be designated by a user of the portable electronic device,
wherein the display panel is capable of continuing to display an image for at least 45 seconds even without applying a display drive signal for the image after applying the display drive signal;
wherein multiple pages which are stored in said temporary memory can be simultaneously displayed on said liquid crystal display panel, and
wherein a highlight which is provided on the portion of the displayed information through the sensor by the user of the portable electronic device can be stored in said temporary memory, and
wherein when said portion is again displayed, said highlight remains provided on said portion.

121. The portable electronic device according to claim 120, wherein said first memory is at least one of a magnetic disc, optical disc and EPROM.

122. The portable electronic device according to claim 120, wherein an amount of data which can be stored in said temporary memory is greater than the amount of data which can be displayed by said liquid crystal display panel.

123. The portable electronic device according to claim 120, wherein said device is a portable book.

124. A portable electronic device comprising:
a housing;
a microcomputer in said housing;
a temporary memory in said housing capable of storing information;
a liquid crystal display panel operationally connected to said microcomputer; and
a sensor through which a portion of a displayed information to be highlighted can be designated by a user of the portable electronic device,
wherein the display panel is capable of continuing to display an image for at least 45 seconds even without applying a display drive signal for the image after applying the display drive signal;
wherein multiple pages which are stored in said temporary memory can be simultaneously displayed on said liquid crystal display panel,
wherein the portion of the displayed information which is highlighted through the sensor by the user of the portable electronic device can be stored in said temporary memory, and
wherein when said portion is again displayed, said highlight remains provided on said portion.

125. The portable electronic device according to claim 124, wherein an amount of data which can be stored in said temporary memory is greater than the amount of data which can be displayed by said liquid crystal display panel.

126. The portable electronic device according to claim 124, wherein said device is a portable book.

127. A portable electronic device comprising:
a housing;
a microcomputer in said housing;
a read-out device in said housing for reading out an information stored in a first memory installed in said housing;
a temporary memory capable of temporarily storing data supplied thereto from said first memory;
a display panel operationally connected to said microcomputer; and
a sensor operationally connected to the display panel,
wherein the display panel is capable of continuing to display an image after applying a display drive signal for the image until a next display drive signal is applied when the display drive signal is applied to the display panel less than 30 times per second;
wherein a portion of a displayed information which is highlighted through the sensor by a user of the portable electronic device can be stored in said temporary memory, and when said portion is again displayed, said highlight remains provided on said portion.

128. The portable electronic device according to claim 127, wherein said first memory is at least one of a magnetic disc, optical disc and EPROM.

129. The portable electronic device according to claim 127, wherein an amount of data which can be stored in said temporary memory is greater than the amount of data which can be displayed by said display panel.

130. The portable electronic device according to claim 127, wherein said device is a portable book.

131. A portable electronic device comprising;
a housing;
a microcomputer in said housing;
a read-out device in said housing for reading out an information;
a temporary memory capable of temporarily storing data supplied thereto from said read-out device;
input keys operationally connected to the microcomputer;
a display panel operationally connected to said microcomputer; and
a sensor operationally connected to the display panel,
wherein the display panel is capable of continuing to display an image for at least 45 seconds even without applying a display drive signal for the image after applying the display drive signal,
wherein multiple pages which are stored in said temporary memory can be simultaneously displayed on said display panel, and
wherein a highlight which is provided on a portion of a displayed information by a user of the portable electronic device can be stored in said temporary memory, and
wherein when said portion is again displayed, said highlight remains provided on said portion.

132. The portable electronic device according to claim 131, wherein an amount of data which can be stored in said temporary memory is greater than the amount of data which can be displayed by said display panel.

133. The portable electronic device according to claim 131, wherein said device is a portable book.

134. A portable electronic device comprising:
a housing;
a microcomputer in said housing;
a non-volatile semiconductor memory in said housing;
a temporary memory in said housing capable of storing information;
a display panel operationally connected to said microcomputer; and
a sensor through which a portion of a displayed information to be highlighted can be designated by a user of the portable electronic device,
wherein the display panel is capable of continuing to display an image after applying a display drive signal for the image until a next display drive signal is applied when the display drive signal is applied to the display panel less than 30 times per second;
wherein a highlight which is provided on the portion of the displayed information through the sensor by the user of the portable electronic device can be stored in said temporary memory, and
wherein when said portion is again displayed, said highlight remains provided on said portion.

135. The portable electronic device according to claim 134, wherein said non-volatile semiconductor memory is EPROM.

136. The portable electronic device according to claim 134, wherein an amount of data which can be stored in said temporary memory is greater than the amount of data which can be displayed by said display panel.

137. The portable electronic device according to claim 134, wherein said device is a portable book.

138. A portable electronic device comprising:
a housing;
a microcomputer in said housing;
a temporary memory in said housing capable of storing information;
input keys operationally connected to the microcomputer;
a liquid crystal display panel operationally connected to said microcomputer, wherein the liquid crystal display panel is such that an image display on the liquid crystal display panel remains unchanged during a period when a display drive signal is not applied to the liquid crystal display panel; and
a sensor through which a portion of a displayed information to be highlighted can be designated by a user of the portable electronic device,
wherein the portion of the displayed information which is highlighted through the sensor by the user of the portable electronic device can be stored in said temporary memory, and when said portion is again displayed, said highlight remains provided on said portion.

139. The portable electronic device according to claim 138, wherein an amount of data which can be stored in said temporary memory is greater than the amount of data which can be displayed by said liquid crystal display panel.

140. The portable electronic device according to claim 138, wherein said device is a portable book.

141. A portable electronic device comprising:
a housing;
a microcomputer in said housing;
a non-volatile semiconductor memory in said housing;
a temporary memory in said housing capable of storing information;
a display panel operationally connected to said microcomputer, wherein the display panel is such that an image display on the display panel remains unchanged during a period when a display drive signal is not applied to the display panel; and
a sensor through which a portion of a displayed information to be highlighted can be designated by a user of the portable electronic device,
wherein multiple pages of said information which are stored in said temporary memory can be simultaneously displayed on said display panel, and
wherein a highlight which is provided on the portion of the displayed information through the sensor by the user of the portable electronic device can be stored in said temporary memory,
wherein the portable electronic device is provided with an amorphous semiconductor film, and
wherein when said portion is again displayed, said highlight remains provided on said portion.

142. The portable electronic device according to claim 141, wherein said non-volatile semiconductor memory is EPROM.

143. The portable electronic device according to claim 141, wherein an amount of data which can be stored in said temporary memory is greater than the amount of data which can be displayed by said display panel.

144. The portable electronic device according to claim 141, wherein said device is a portable book.

145. The portable electronic device according to claim 141 further comprising a solar cell wherein the solar cell comprises the amorphous semiconductor film.

146. The portable electronic device according to claim 141 wherein the amorphous semiconductor film includes an NI junction.

147. The portable electronic device according to claim 141 wherein the amorphous semiconductor film comprises silicon.

148. A method for operating a portable electronic device comprising the steps of:
reading data from a first memory;
temporarily storing said data in a temporary memory;
applying a display drive signal to a display panel to display an image stored in said temporary memory on the display panel;
maintaining the image on the display panel in a static condition for at least 45 seconds even without applying the display drive signal for the image after applying the display drive signal;
designating a particular portion of the displayed image;
emphasizing said particular portion for modifying an appearance of said particular portion to visually highlight said portion on the display;
storing the visually highlighted particular portion in the temporary memory; and
displaying again said portion wherein said highlight remains provided on said portion.

149. The method according to claim 148 wherein the data is set a uniform standard.

150. The portable electronic device according to any one of claims 59-79 and 134 wherein the non-volatile semiconductor memory is a detachable memory.

151. The portable electronic device according to any one of claims 83-120 and 127 wherein said first memory is a detachable memory.

* * * * *

UNITED STATES PATENT AND TRADEMARK OFFICE
CERTIFICATE OF CORRECTION

| | | |
|---|---|---|
| PATENT NO. | : 7,864,151 B1 | Page 1 of 1 |
| APPLICATION NO. | : 07/825784 | |
| DATED | : January 4, 2011 | |
| INVENTOR(S) | : Shunpei Yamazaki et al. | |

It is certified that error appears in the above-identified patent and that said Letters Patent is hereby corrected as shown below:

ON THE TITLE PAGE:

Section (56), References Cited, U.S. PATENT DOCUMENTS, should include the following:

4,693,563 A           9/1987     Harada et al.

4,850,677 A           7/1989     Okumura

Section (56), References Cited, FOREIGN PATENT DOCUMENTS, should include the following:

JP 63-039761         2/1988

IN THE SPECIFICATIONS:

Column 6, line 27, "light pen 22" should be "light pen"

IN THE CLAIMS:

Column 12, line 31, claim 58, "claim 53" should be "claim 56"

Column 16, line 55, claim 94, "main" should be "again"

Column 22, line 59, claim 150, "claims 59-79 and 134" should be "claims 59, 63, 67, 71, 75, 79 and 134"

Column 22, line 62, claim 151, "claims 83-120" should be "claims 83, 87, 94, 101, 108, 112, 116, 120 and 127"

Signed and Sealed this
Sixth Day of March, 2012

David J. Kappos
*Director of the United States Patent and Trademark Office*